May 3, 1927.
F. BONCHINA
PLANTING MACHINE
Filed July 30, 1926
1,627,143
3 Sheets-Sheet 1
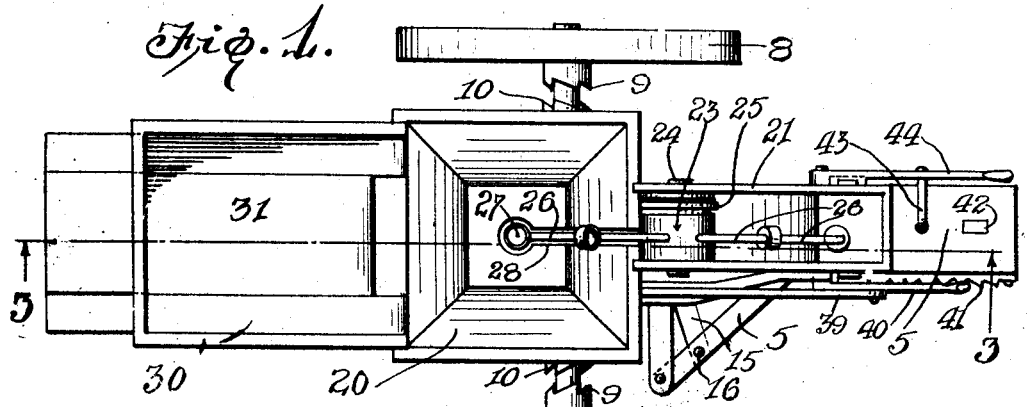
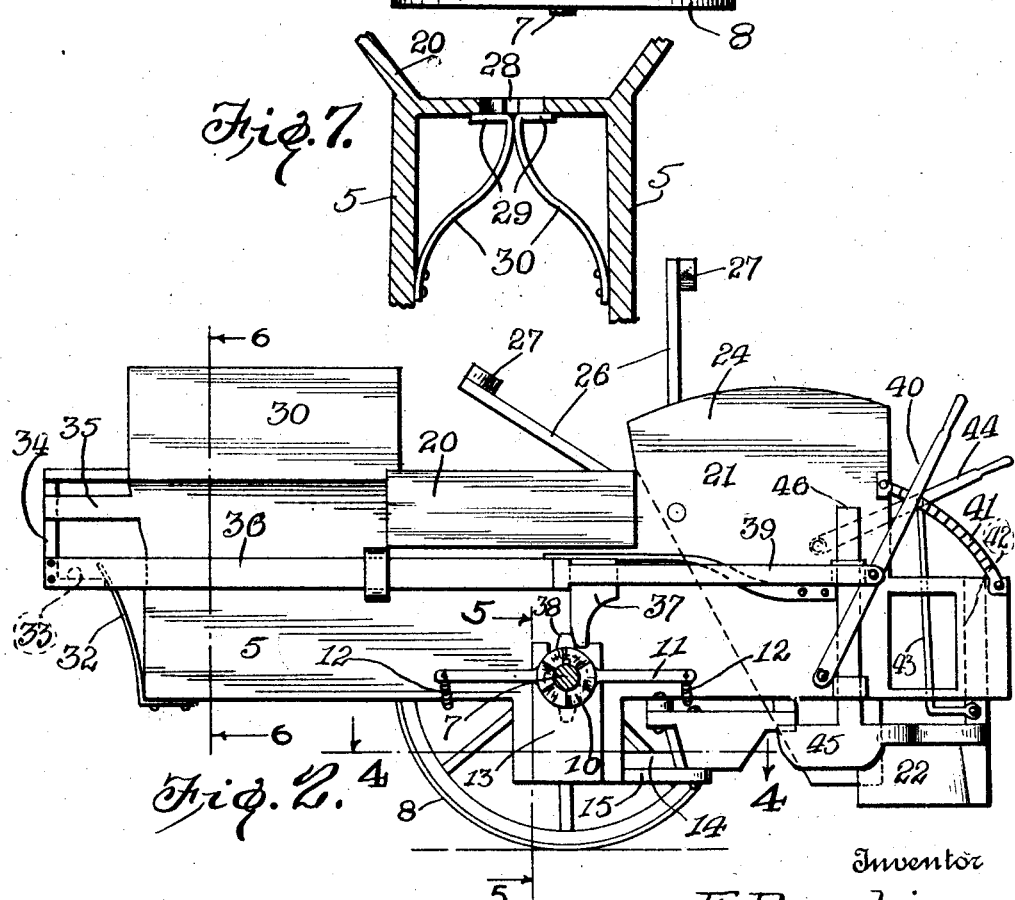
Inventor
F. Bonchina
by Bryant & Lowry
Attorneys

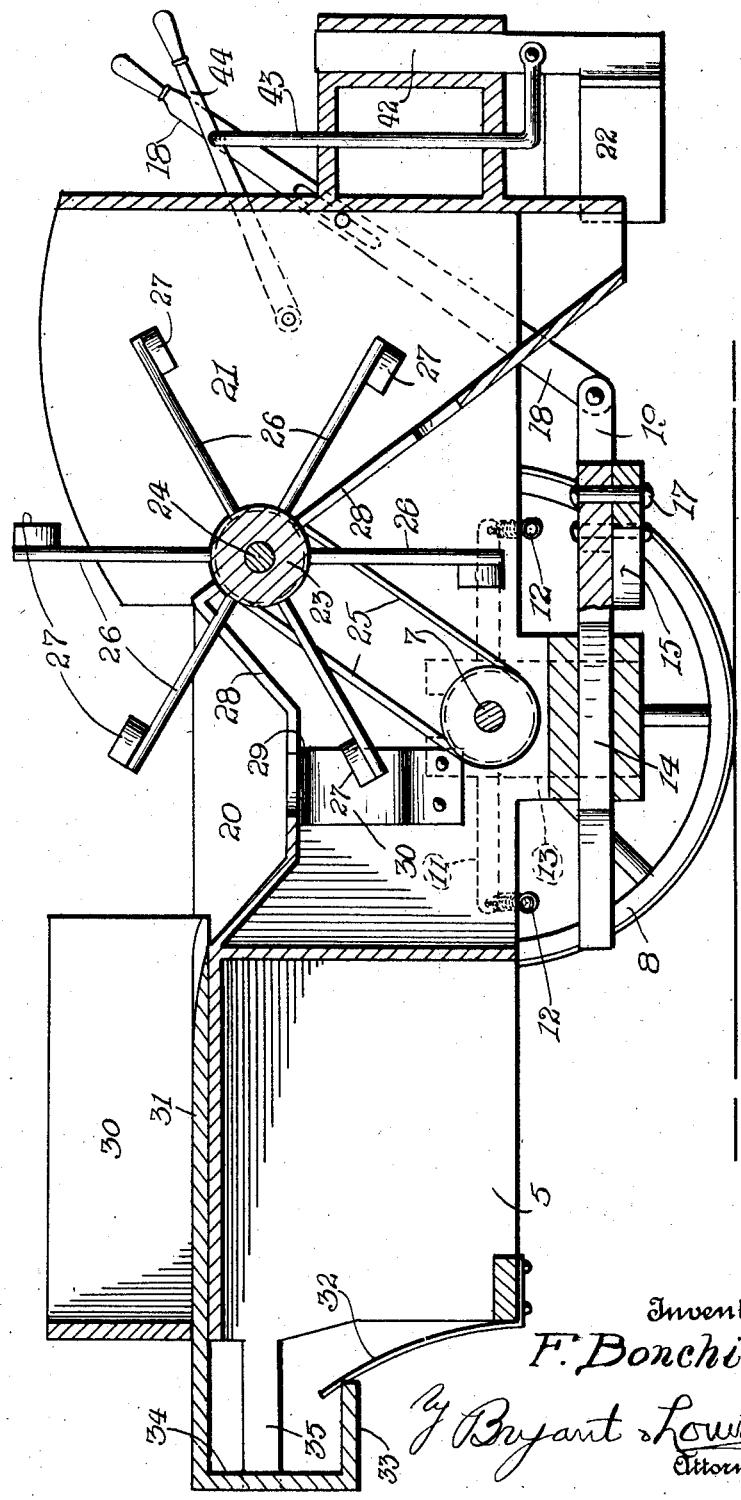

Inventor
F. Bonchina.
by Bryant & Lowry
Attorneys

Patented May 3, 1927.

1,627,143

UNITED STATES PATENT OFFICE.

FRANK BONCHINA, OF CAIRNBROOK, PENNSYLVANIA.

PLANTING MACHINE.

Application filed July 30, 1926. Serial No. 126,032.

This invention relates to certain new and useful improvements in planting machines, and has more particular reference to an improved machine of this kind especially adapted for effectively carrying out the operation of planting seed potatoes and other seeds that are adapted to be planted in a furrow, either singly or in predetermined numbers at regular intervals.

The primary object of the invention is to provide a planting machine of the above kind which is extremely simple and durable in construction as well as efficient in operation.

A further object is to provide a planting machine of the above kind embodying a relatively shallow seed hopper, a delivery chute or spout, a rotatable device including a plurality of seed cup carrying arms movable through the hopper and the spout for intermittently delivering a predetermined number of seeds from the hopper and dropping the same into the spout for delivery into the furrow, a seed box adapted to receive a large quantity of the seeds to be planted, and means for intermittently delivering a quantity of the seeds from the seed box to the hopper so that a required small quantity of seeds will be at all times had within the hopper for delivery to the spout, and whereby the quantity of seeds maintained within the shallow hopper will be comparatively small so as to offer a minimum resistance to the rotation of the seed delivery and dropping device.

Still another object of the invention is to provide improved mechanism for effecting delivering of quantities of seeds intermittently from the seed box to the hopper upon the forward travel of the machine, and manually operable means for rendering the said means for delivering seeds to the hopper inoperative at will.

A still further object is to provide improved means for effecting operation of the rotatable device for delivery of seeds from the hopper to the delivery spout, and improved manually operable means for rendering said rotatable device inoperative at will.

A still further object is to provide simple and effective means for preventing the seeds from dropping through the seed hopper while at the same time permitting free upward passage of the seed cups for delivering quantities of the seeds from the hopper to the delivery spout.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a top plan view of a planting machine constructed in accordance with the present invention, with parts omitted;

Figure 2 is a view of the machine shown in Figure 1, partly in side elevation and partly in longitudinal section;

Figure 3 is a longitudinal section taken substantially upon line 3—3 of Figure 1 and drawn on a larger scale;

Figure 7 is a fragmentary vertical transverse section taken through the seed hopper and adjacent parts.

Figure 4:
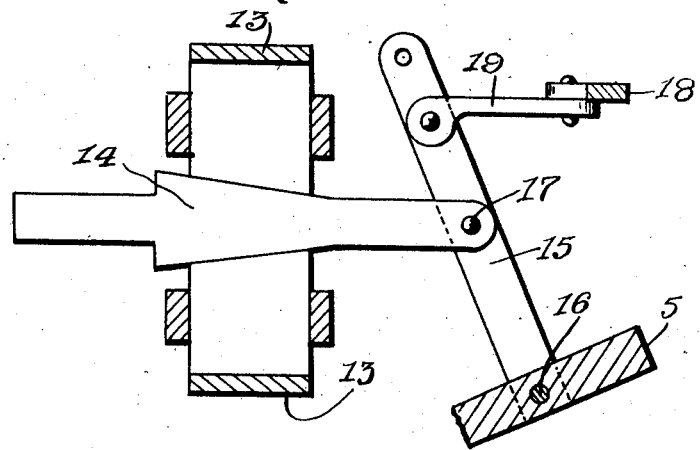
Figure 4 is a fragmentary horizontal section taken substantially upon line 4—4 of Figure 2.

Referring more in detail to the drawings, the present planting machine generally embodies a longitudinally elongated frame 5 of suitable construction, and through the intermediate lower portion of which is freely journaled a transverse supporting axle 7 whose ends project beyond opposite sides of the frame 5 and have suitable ground engaging or supporting wheels 8 journaled thereon. The hubs of the supporting wheels 8 are provided at their inner sides with rigid ratchet clutch elements 9 adapted to cooperate with similar clutch elements 10 slidably keyed upon the axle 7 inwardly of the wheels 8, whereby, when the clutch elements 10 are slid outwardly into engagement with the clutch elements 9, the rotation of the supporting wheels 8 will be transmitted to the axle 7 upon forward travel of the planting machine for the actuation of certain mechanisms as will presently become apparent. It will also be seen that when the clutch elements 10 are disengaged from the clutch elements 9, the supporting wheels 8 may freely rotate without imparting rotation to the axle 7 so that the planting machine may be readily transported from one place to another without causing operation of said mechanisms. Further, by reason of the ratchet form of the clutch elements 9 and 10, it will be seen that the supporting wheels 8 may freely rotate backwardly without influencing the axle 7, whereby reverse actuation of said mechanisms will be prevented upon backing of the machine, and whereby short turns may be effected without interrupting the operation of the planting machine. These facts will be evident when it is pointed out that the mechanisms referred to are driven from the axle 7 when the latter is caused to rotate by clutching of the supporting wheels 8 therewith.

Figure 5:
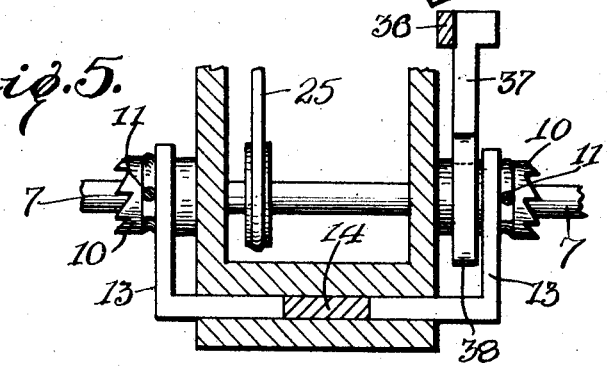
Figure 5 is a fragmentary vertical section taken substantially upon line 5—5 of Figure 2.
Figure 6:
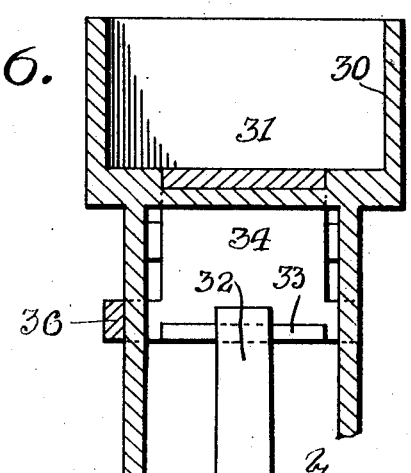
Figure 6 is a vertical transverse section taken substantially upon line 6—6 of Figure 2.

As shown more clearly in Figures 2 and 5, the clutch elements 10 are swiveled in the intermediate portions of horizontal cross bars 11 arranged longitudinally of and at opposite sides of the frame 5, and the ends of these cross bars 11 are connected with the frame 5 by helical tension springs 12 so that the clutch elements 10 are normally yieldingly slid inwardly to released position. Operatively engaged with the clutch elements 10 are angular clutch shifting elements or forks 13 whose lower horizontal arms project inwardly toward each other and are slidably guided for transverse movement toward and away from each other in a slotted depending intermediate portion of the frame 5 as shown in Figure 5. The horizontal lower arms of the clutch shifting elements 13 are disposed in opposed spaced relation, and slidable longitudinally in the depending intermediate part of the frame 5 between the adjacent ends of the horizontal arms of clutch shifting elements 13 is a wedge bar 14 adapted to be slid forwardly for forcing the clutch shifting forks apart and thereby causing engagement of the clutch elements 10 with the clutch elements 9. Obviously, when the wedge bar 14 is moved rearwardly the clutch elements 10 will be allowed to separate and disengage from the clutch elements 9 under the action of the springs 12. The movement of the wedge bar 14 is preferably accomplished by operating means including a transverse lever 15 disposed beneath the forward portion of the frame 5 and having one end pivoted to the latter as at 16, the forward end of the wedge bar 14 being pivoted to said lever 15 intermediate the ends of the latter as indicated at 17. This operating means further includes a hand lever 18 pivoted intermediate its ends to one side of the forward portion of frame 5 and having its lower end operatively connected to the other end of lever 15 by means of a link 19. Thus, when the upper end of lever 18 is swung rearwardly the forward sliding movement of the wedge bar 14 is effected, while rearward sliding movement of said wedge bar is had when the upper end of lever 18 is swung forwardly.

Mounted in the upper portion of the intermediate part of frame 5 is a relatively shallow seed receiving hopper 20, and suitably mounted in the forward part of frame 5 directly forwardly of the hopper 20 is a vertical delivery spout 21 whose lower end terminates at a point adjacent the ground directly in the rear of a furrow opener 22.

A rotary device is provided for delivering the seeds or seed potatoes from the hopper 20 and dropping the same intermittently into the delivery spout 21, one at a time or in predetermined numbers, depending upon the character of the seeds being planted. This rotary device includes a hub member 23 fixed upon a transverse horizontal shaft 24 suitably journaled in the frame 5 at the upper rear part of the delivery spout 21 and operatively connected with the axle 7 by means of a belt gearing generally indicated at 25, the hub 23 being provided with a plurality of equally spaced radial arms 26 having seed cups 27 rigidly fastened to similar sides of the outer ends thereof. The adjacent walls of the hopper 20 and the spout 21 and the bottom wall of the hopper 20 are slotted as at 28 to provide just sufficient clearance for the passage of the seed cup carrying arms 26 when rotated, and it will be noted that the enlargement of the slot 28 of the hopper 20 is at the bottom of the latter where a proper quantity of seeds is maintained at all times due to the downwardly converging relation of the side walls of hopper 20 as shown clearly in Figure 3. The enlarged end portion of the hopper slot 28 for the passage of the cups 27 is normally closed by means of a pair of horizontal slide elements 29 which are normally yieldingly held in adjacent closing relation and constitute outturned upper ends of downwardly diverging spring arms 30. Thus, upon forward travel of the planting machine with the clutch elements 10 engaged with the clutch elements 9, the seed transferring and dropping device will be rotated in a clockwise direction as viewed in Figure 3, and as the successive seed cups move upwardly they will force the spring arms 30 apart so as to separate the slide elements 29 and permit the cup to take up a seed potato or a quantity of seeds which will be subsequently dropped into the delivery spout 21 upon continued rotation of the delivery and dropping device. Obviously, as one cup passes upwardly into the hopper 20 past the slide members 29, the latter will be quickly immediately forced together to closing position until the next succeeding cup forces the same apart, thereby preventing loss of seeds by reason of the latter dropping downwardly through the portion of the slot 28 in the bottom of hopper 20.

As the hopper 20 is comparatively shallow and adapted to only contain a small quantity of the seeds or seed potatoes so that a minimum resistance is offered to the rotation of the cup carrying arms 26 which pass therethrough, it is necessary to provide means for carrying a considerable supply of the seeds or seed potatoes for delivery to the hopper 20 so that the planting operation may be continued without interruption. For this purpose, I provide a relatively large seed box 30 upon the upper rear portion of the frame 5 adapted to initially receive the supply of seeds or seed potatoes, and as shown clearly in Figures 1 and 3, this seed box is open at its forward end and arranged so that a quantity of the seeds or seed potatoes may be displaced therefrom directly into the hopper 20. In order to effect displacement of a small quantity of the seeds or seed potatoes from the seed box 30 into the hopper 20 at the required intervals, a delivery slide or ejector plate 31 is longitudinally movable upon the bottom of the seed box 30 and is normally moved to an inactive rearwardly slid position by means of a spring 32 having its lower end attached to the frame 5 and its upper end bearing upon the forwardly projecting end portion 33 of the depending rear end part 34 of said ejector plate. It will be noted that the depending part 34 is slidably guided between a pair of rearwardly projecting guide arms 35 on the frame 5 and is carried by the rear end of the plate 31 which slidably projects through the rear end of the seed box 30 (see Fig. 3).

Slidably mounted at one side of the frame 5 is a horizontal operating bar 36 whose rear end is rigidly attached to the depending part 34 of the slide plate 31 and whose forward end carries a rigid depending arm 37 adapted to be intermittently and successively engaged by the arms of a two arm cam element 38 fixed upon the axle 7 when the latter is caused to rotate by being clutched with the supporting wheels 8. Thus, the arms of the cam element 38 will intermittently strike the arm 37 for thereby causing intermittent sliding movement of the ejector plate 31 in a forward direction against the action of the spring 32, a small quantity of the seeds or seed potatoes being ejected from the seed box 30 into the hopper 20 at each forward movement of the plate 31. A restricted or limited delivery of seeds or seed potatoes from the seed box 30 by means of the plate 31 is more positively insured by reason of the fact that the plate 31 is considerably narrower than the seed box, and it will further be apparent that as soon as an arm of the cam element 31 passes the arm 37 the latter will be released so that the spring 32 will immediately return the slide 31 to its rearward inactive position until the arm 37 is again engaged by the next succeeding arm of the cam element 38. The rear end of an actuating rod 39 is slidably engaged with the operating bar 36 rearwardly of the arm 37, and this rod 39 is pivotally attached at its forward end to a vertically swinging hand lever 40 pivoted to the side of the frame 5 and associated with a rack segment 41 fixed to the frame 5 and the delivery spout or chute 21. By swinging the lever 40 forwardly the limit of rearward movement of the slide 31 under the action of the spring 32 may be adjusted by reason of the fact that the arm 37 will about the rear end of bar 39 when moved rearwardly. Thus, in this way, the length of stroke of the ejector plate 31 may be controlled or adjusted so that the quantity of seeds or seed potatoes delivered from the seed box to the hopper 20 may be varied according to conditions met with during different planting operations. Naturally, when the rearward movement of the arm 37 is limited to a certain point by adjustment of the lever 40, the arms of the cam element 38 will not come into engagement with the arm 37 until a later point of their revolutions than would be the case were the lever 40 adjusted to permit further rearward movement of the arm 37. It will be noted that by reason of the construction shown, a plurality of the cups will transfer seeds from the hopper 20 during the interval between each operation of the ejector plate 31 so that an over-supply of seeds or seed potatoes from the seed box to the hopper is not had.

The furrow opener 22 consists of a conventional plow disposed directly in front of the lower end portion of delivery spout 21 and rigid upon the lower end of a vertical standard 42 slidably mounted in the forward end of the frame 5. Attached to the standard 42 is an operating rod 43 whose upper end is connected with a hand lever 44 pivoted for vertical swinging movement. This hand lever may be associated with a suitable rack segment if desired so as to maintain the same in any desired position, and it will be seen that by raising the lever 44 the furrow opener 22 may be elevated to an inactive position, or lowered to an active position, the distance of lowering of the furrow opener regulating the depth of the furrow to suit conditions. Rearwardly converging covering blades 45 are disposed at opposite sides of the lower end of spout 21 and project rearwardly of the latter, so that they may act to cover the seeds after they are deposited in the furrow through the delivery spout 21. These covering blades or plates 45 are rigidly attached to the standard 42 and carried by vertically slidable standards 46 so that they may be vertically adjusted to correspond with the vertical adjustment of the furrow opener 22, adjustment of both the furrow opener and the covering blades 45 being accomplished by operation of the same lever 44.

In operation, a quantity of seeds or seed potatoes are placed in the seed box 30 and the furrow opener 22 is engaged with the ground so as to cause the formation of a furrow of the required depth upon forward travel of the planting machine. This forward travel of the machine may be effected in any desired manner, and upon starting of the formation of the furrow, the lever 18 is actuated to engage the clutch elements 10 with the clutch elements 9 so as to cause rotation of axle 7 and shaft 24. Upon continued forward travelling movement of the planting machine the slide 31 will be actuated to deliver a small quantity of seed potatoes or seeds from the seed box 30 into the hopper 20 where they will be successively delivered in predetermined quantities from the hopper 20 and dropped into the delivery spout 21 by the seed cups 27 moving upwardly through the hopper 20 as the arms 26 carrying said cups rotate in a clockwise direction. Thus, a predetermined quantity of seeds is intermittently dropped into the delivery spout 21 for being planted in the furrow at regular intervals, the seeds being automatically covered by the blades 45 upon the forward travel of the machine. Upon each revolution of axle 7 two forward movements are imparted to the slide 31 so that the supply of seeds or seed potatoes in the hopper 20 is replenished at proper intervals so as to at all times present a sufficient quantity of seeds or seed potatoes in the hopper 20 for delivery from the latter by the upwardly moving cups 27.

From the above general description of the operation and the detailed explanations of the various operations outlined as the specific description progressed, it is believed that the invention will be clearly understood and its advantages appreciated by those skilled in the art.

Minor changes may be made without departing from the spirit and scope of the invention as claimed.

What I claim as new is:—

1. A planting machine comprising a frame having a relatively shallow seed hopper mounted thereon, a delivery spout arranged in advance of the seed hopper, means for intermittently delivering predetermined quantities of seeds from the seed hopper and dropping the same into the delivery spout, a seed box having a delivery end arranged to discharge into the seed hopper, and an ejector mechanism for intermittently ejecting predetermined quantities of seeds from the seed box into said hopper, said ejector mechanism comprising a longitudinally slidable ejector plate slidable upon the bottom of the seed box, yieldable means for normally retracting the ejector plate to an inoperative position, and cam mechanism for automatically intermittently sliding the ejector plate from inactive position to effect delivery of the quantity of seeds to the hopper.

2. In a planting machine of the character described, wherein a delivery chute and a relatively shallow seed hopper are associated with means for intermittently delivering predetermined quantities of seeds from the hopper and dropping the same into the chute, means for replenishing the supply of seeds in the hopper comprising a seed box and means for intermittently ejecting a quantity of seeds from the seed box into the hopper, said last named means comprising an ejector plate slidable on the bottom of the seed box, spring means normally urging the ejector plate in one direction, and cam operated means for sliding the ejector plate in the opposite direction against said spring means.

In testimony whereof I affix my signature.

FRANK BONCHINA.